(12) United States Patent
Furukawa

(10) Patent No.: US 12,319,537 B2
(45) Date of Patent: Jun. 3, 2025

(54) SHEET CONVEYING APPARATUS AND IMAGE READING APPARATUS

(71) Applicant: CANON KABUSHIKI KAISHA, Tokyo (JP)

(72) Inventor: Masato Furukawa, Chiba (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/477,031

(22) Filed: Sep. 28, 2023

(65) Prior Publication Data
US 2024/0025684 A1 Jan. 25, 2024

Related U.S. Application Data

(63) Continuation of application No. 17/099,512, filed on Nov. 16, 2020, now Pat. No. 11,807,490.

(30) Foreign Application Priority Data

Nov. 27, 2019 (JP) ................................. 2019-213934

(51) Int. Cl.
B65H 7/18 (2006.01)
B65H 7/12 (2006.01)
H04N 1/00 (2006.01)

(52) U.S. Cl.
CPC ............... *B65H 7/18* (2013.01); *B65H 7/125* (2013.01); *H04N 1/00591* (2013.01); *H04N 1/00708* (2013.01); *B65H 2511/11* (2013.01); *B65H 2511/524* (2013.01); *B65H 2801/39* (2013.01)

(58) Field of Classification Search
CPC ................ B65H 7/125; B65H 2511/11; B65H 2511/524; H04N 1/00591; H04N 1/00708
See application file for complete search history.

(56) References Cited

U.S. PATENT DOCUMENTS

| 4,286,149 A | * | 8/1981 | Ben-Nathan | ........... B65H 7/125 377/53 |
| 5,250,803 A | * | 10/1993 | Christ | .................... B65H 7/125 271/263 |
| 5,614,710 A | * | 3/1997 | Mondie | .................. B65H 7/125 250/223 R |
| 7,654,521 B2 | * | 2/2010 | Simonis | .................. B65H 7/20 271/262 |

(Continued)

*Primary Examiner* — Patrick Cicchino
(74) *Attorney, Agent, or Firm* — Canon U.S.A., Inc. IP Division

(57) ABSTRACT

A sheet conveying apparatus includes a tray having a plurality of sheets, a feeder to successively convey sheets stacked on the tray, a controller, and a double-feed sensor to detect double feed when the feeder conveys a plurality of sheets in an overlapping manner. When a double-feed length, which corresponds to a length, in a conveyance direction of the sheet, of a region in which the double feed has been detected by the double-feed sensor, is larger than a predetermined distance, the controller determines that the double feed has occurred. When the double-feed length is smaller than the predetermined distance and a sheet size is smaller than a predetermined size, the controller determines that the double feed has occurred. When the double-feed length is smaller than the predetermined distance and the sheet size is larger than the predetermined size, the controller determines that the double feed has not occurred.

8 Claims, 15 Drawing Sheets

(56) References Cited

U.S. PATENT DOCUMENTS

| | | | | |
|---|---|---|---|---|
| 7,654,522 B2* | 2/2010 | Tonami | ................... | B65H 7/125 |
| | | | | 271/262 |
| 7,822,376 B2* | 10/2010 | Nagano | .............. | G03G 15/6511 |
| | | | | 399/388 |
| 8,444,142 B2* | 5/2013 | Fujii | ...................... | B65H 7/125 |
| | | | | 382/199 |
| 8,567,776 B2* | 10/2013 | Niwano | ................... | B65H 7/12 |
| | | | | 271/262 |
| 8,579,286 B2* | 11/2013 | Hirai | ........................ | B65H 5/04 |
| | | | | 271/265.01 |
| 9,715,354 B2* | 7/2017 | Tachibana | ................. | B65H 7/20 |
| 9,796,547 B2* | 10/2017 | Yabune | .............. | H04N 1/00755 |
| 9,957,124 B2* | 5/2018 | Saito | ...................... | B65H 7/125 |
| 10,432,810 B2* | 10/2019 | Fujiwara | ............ | H04N 1/00777 |
| 11,053,090 B1* | 7/2021 | Noviello | ............. | H04N 1/00039 |
| 2012/0248678 A1* | 10/2012 | Serizawa | ............... | B65H 7/125 |
| | | | | 271/10.01 |

\* cited by examiner

| WIDTH SENSOR 151a | WIDTH SENSOR 151b | DETERMINATION |
|---|---|---|
| OFF | OFF | ORIGINAL HAVING BUSINESS CARD SIZE |
| OFF | ON | STANDARD-SIZE ORIGINAL A LARGER THAN BUSINESS CARD |
| ON | ON | STANDARD-SIZE ORIGINAL B LARGER THAN STANDARD-SIZE ORIGINAL A |
| ON | OFF | STANDARD-SIZE ORIGINAL B LARGER THAN BUSINESS CARD, OR OUT OF ORDER |

FIG. 14

SHEET CONVEYING APPARATUS AND IMAGE READING APPARATUS

CROSS REFERENCE TO RELATED APPLICATIONS

The present application is a continuation of U.S. patent application Ser. No. 17/099,512, filed on Nov. 16, 2020, which claims priority from Japanese Patent Application No. 2019-213934, filed Nov. 27, 2019, all of which are hereby incorporated by reference herein in their entireties.

BACKGROUND

Field

The present disclosure relates to a sheet conveying apparatus configured to convey a sheet, and to an image reading apparatus including the sheet conveying apparatus.

Description of the Related Art

There is known a sheet conveying apparatus having a double-feed detection function of detecting a state in which sheets are conveyed in an overlapping state (so called "multi-feed" or "double-feed", hereinafter referred to as "double-feed"). In U.S. Pat. No. 9,027,919 B2, there is disclosed a sheet feeding apparatus configured to convey a preceding sheet and a subsequent sheet partially in a double-feed state. In this sheet feeding apparatus, double-feed detection is successively performed at a predetermined number of detecting points along a sheet conveyance direction at every predetermined time. The sheet feeding apparatus determines whether or not the sheets are conveyed in the double-feed state based on the number of detecting points at which the double-feed state is detected. Further, in U.S. Pat. No. 7,822,376 B2, there is disclosed a sheet conveying apparatus configured to prevent a sheet having a label or other paper pieces attached thereto from being falsely detected as sheets in the double-feed state.

The sheet feeding apparatus of U.S. Pat. No. 9,027,919 B2 is provided for the purpose of conveying sheets in a partially overlapping state, but can also be used in a case of conveying the sheets in a non-overlapping state as usual. For example, this sheet feeding apparatus may convey the sheets while assuming the non-overlapping state as a normal state, and determine that abnormality has occurred in a case where the double feed has been detected. In any case, the occurrence of the double feed is determined based on the number of detecting points at which the double-feed state is detected.

A plurality of detecting points are provided along the sheet conveyance direction, and hence a length in the conveyance direction of a region in which the double feed has been detected (hereinafter referred to as "double-feed length") can be measured based on the number of detecting points at which the double feed is detected. In a case where a label and a business card have substantially the same length, a sheet having a label attached thereto has substantially the same double-feed length as business cards overlapping each other without a shift in the conveyance direction (complete double feed). Thus, when there is provided a setting that double feed of business cards can be detected, a sheet having a label attached thereto is also determined as double feed. It is possible to provide a setting that a sheet having a label attached thereto is not determined as double feed in a case where the double-feed length is regarded as a length of a label. In this case, however, business cards in a complete double-feed state are also not determined as the double feed.

When the double-feed length is equal to a length obtained by subtracting "difference value" from "original length", it is determined that the double feed has occurred ("original length" is a length obtained by measuring, in the conveyance direction of a sheet, a sheet being conveyed, and "difference value" is a value obtained by subtracting an actual length in the conveyance direction of a sheet (hereinafter referred to as "sheet length") from "original length"). While the plurality of sheets in the double-feed state are conveyed, a length of a region in which the sheets overlap each other (hereinafter referred to as "double-feed region") may be changed. In a case where the length of the double-feed region is changed during a period from the measurement of the double-feed length to the measurement of the original length, the above-mentioned condition is not satisfied, and thus there is a risk in that the occurrence of the double feed cannot be determined.

In a case where the occurrence of the double feed cannot be accurately determined as described above, the sheet conveyance is continued under the double-feed state. The continuation of the double-feed state may cause damages such as tearing and folding on the sheets. Further, in a case in which the sheet conveying apparatus is provided in an image reading apparatus, in a case where the sheets are conveyed while maintaining the double-feed state, some sheets may not be subjected to image reading, and thus the reading result may have a page dropout.

SUMMARY

According to an aspect of the present disclosure, a sheet conveying apparatus includes a tray on which a plurality of sheets are to be stacked, a feeder configured to successively convey sheets stacked on the tray, a double-feed sensor configured to detect double feed corresponding to a state in which a plurality of sheets are conveyed in an overlapping manner by the feeder, and a controller, wherein, in a case where a double-feed length, which corresponds to a length, in a conveyance direction of the sheet, of a region in which the double feed has been detected by the double-feed sensor, is larger than a predetermined distance, the controller determines that the double feed has occurred, wherein, in a case where the double-feed length is smaller than the predetermined distance and a sheet size is smaller than a predetermined size, the controller determines that the double feed has occurred, and wherein, in a case where the double-feed length is smaller than the predetermined distance and the sheet size is larger than the predetermined size, the controller determines that the double feed has not occurred.

The present information discloses a sheet conveying apparatus capable of accurately determining double feed of sheets. Further features of the present disclosure will become apparent from the following description of exemplary embodiments (with reference to the attached drawings).

BRIEF DESCRIPTION OF THE DRAWINGS

FIG. 14 is an explanatory table for showing original width detection.

DESCRIPTION OF THE EMBODIMENTS

Now, embodiments of the present disclosure are described in detail with reference to the drawings.

First Embodiment

Figure 1:
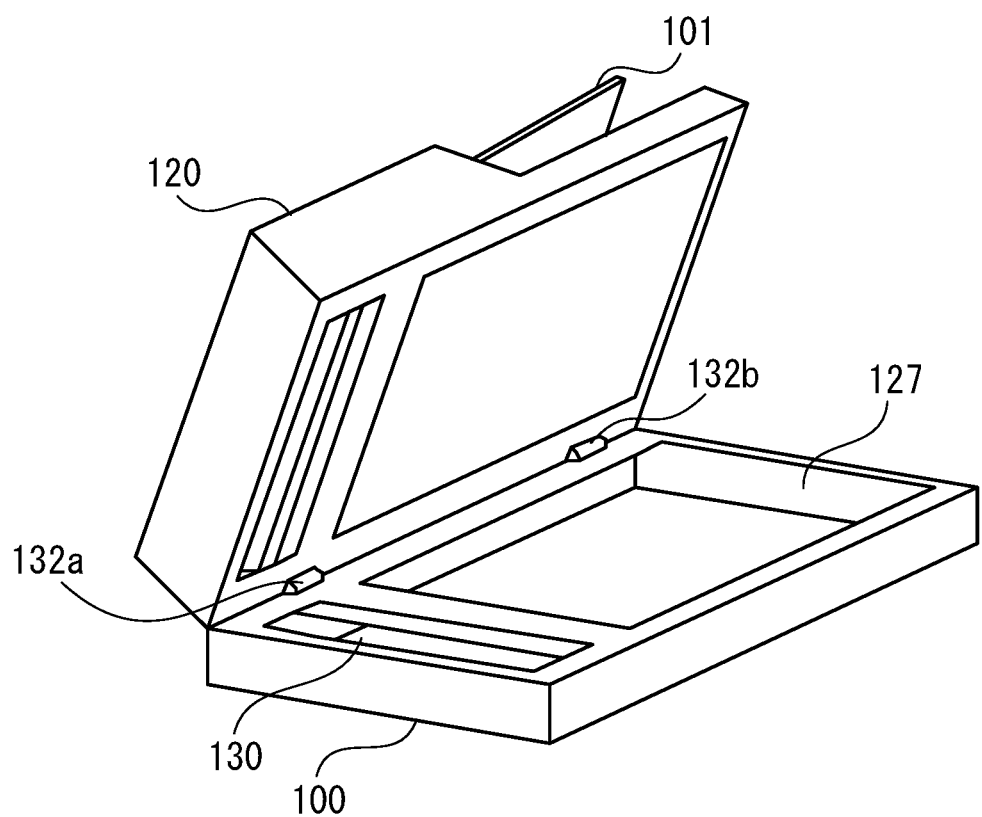
FIG. 1 is an exterior perspective view of an image reading apparatus.

FIG. 1 is an exterior perspective view of an image reading apparatus including an auto document feeder (ADF). An ADF 120 is mounted to an image reading apparatus 100 by hinges 132a and 132b so as to be freely openable and closable such as without meaningful restrictions. The ADF 120 includes an original tray 101 on which sheet-like originals are to be stacked. The ADF 120 corresponds to a sheet conveying apparatus configured to convey an original to a reading position at which the image reading apparatus 100 reads an image from the original. The image reading apparatus 100 includes a platen glass 127 and a reading glass 130 on a surface with respect to which the ADF 120 is opened and closed. The image reading apparatus 100 is capable of selectively reading an image of an original conveyed from the original tray 101 by the ADF 120 and an image of an original placed on the platen glass 127. The image reading apparatus 100 incorporates a controller to be described later. The controller controls operations of the ADF 120 and the image reading apparatus 100.

Figure 2A:
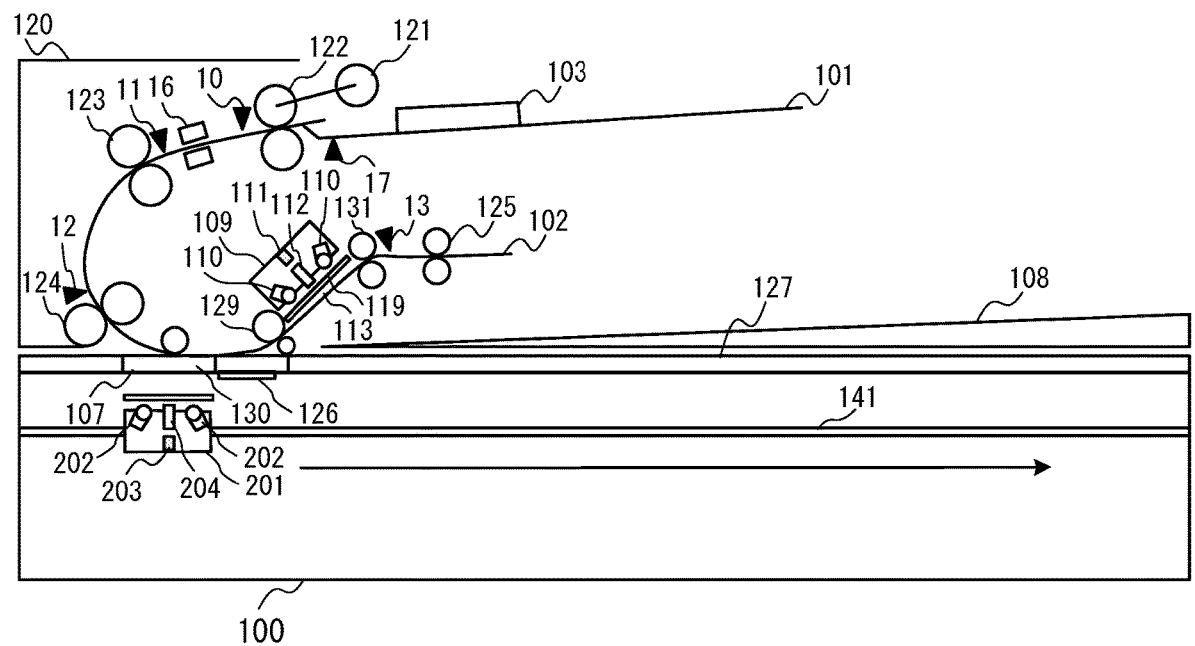
FIG. 2A and FIG. 2B are explanatory views of the image reading apparatus.
Figure 2B:
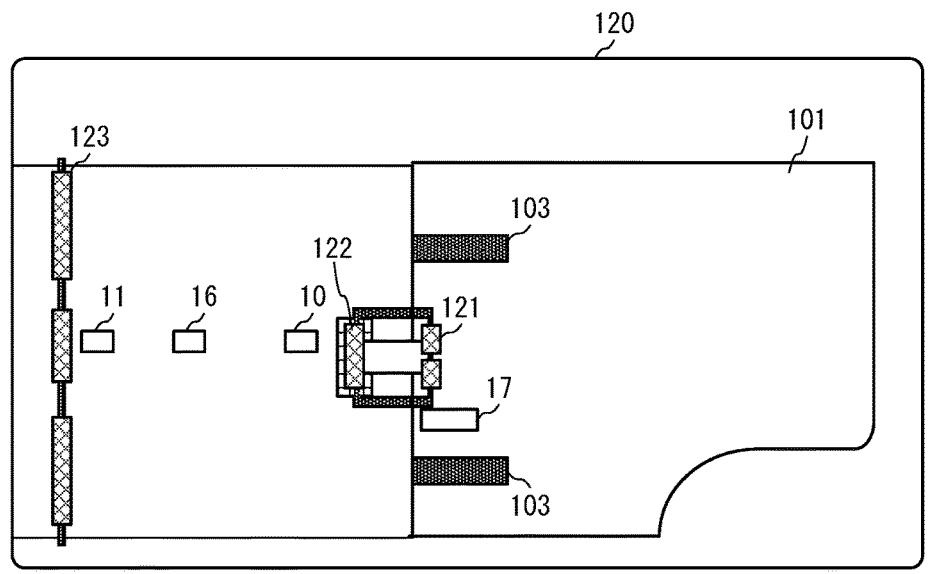

FIG. 2A and FIG. 2B are explanatory views of the image reading apparatus 100 including the ADF 120. FIG. 2A is an interior configuration view of the image reading apparatus 100 including the ADF 120. FIG. 2B is a top view of the ADF 120. A front-surface reading section 201, a movement guide 141, and a white reference plate 126 are installed in the image reading apparatus 100. The front-surface reading section 201 reads an image on one surface (front surface) of the original. The front-surface reading section 201 is movable along the movement guide 141 by a motor (not shown). In a case where the original conveyed by the ADF 120 is read, the front-surface reading section 201 performs image reading processing while being fixed below the reading glass 130. In a case where the original placed on the platen glass 127 is read, the front-surface reading section 201 performs the image reading processing while moving along the movement guide 141. The white reference plate 126 is read by the front-surface reading section 201 in a case where shading correction of the front-surface reading section 201 is performed. The white reference plate 126 is provided between the platen glass 127 and the reading glass 130.

The ADF 120 conveys the original placed on the original tray 101 to a sheet discharge tray 108 via a conveyance path. A plurality of originals can be placed on the original tray 101. The original tray 101 includes two width regulating plates 103 in a width direction orthogonal to the original conveyance direction. The two width regulating plates 103 are movable in the width direction, and are configured to sandwich an original placed on the original tray 101 to regulate the movement of the original in the width direction.

The ADF 120 successively conveys the originals to the conveyance path. The conveyance path is provided with various rollers configured to convey the originals and various sensors configured to detect the originals. The ADF 120 includes a pick-up roller 121 and separation rollers 122. The pick-up roller 121 falls onto an uppermost surface of a bundle of originals stacked on the original tray 101, and rotates to feed the uppermost original to the conveyance path. The separation rollers 122 separates and conveys one uppermost sheet even when two originals are conveyed by the pick-up roller 121. The separation of the originals may be performed by a separation technology. The separation rollers 122 convey the original to registration rollers 123.

The registration rollers 123 are stopped in a case where the original is conveyed thereto by the separation rollers 122. Thus, the original abuts against a nip position between the registration rollers 123. In a case where the original abuts against the registration rollers 123, a leading-edge part warps toward the upstream in the conveyance direction. This warpage minimizes or eliminates skew feed of a leading-edge side of the original, which is caused by the conveyance. The registration rollers 123 start rotating after eliminating the skew feed, and convey the original to lead rollers 124. The lead rollers 124 convey the original to lead rollers 129 via a portion on the reading glass 130. The portion on the reading glass 130 between the lead rollers 124 and the lead rollers 129 corresponds to an original reading position 107 at which the front-surface reading section 201 reads the original. The lead rollers 129 convey the original to conveyance rollers 131. The conveyance rollers 131 convey the original to discharge rollers 125. The discharge rollers 125 discharge the original to the sheet discharge tray 108 through a discharge portion 102. A back-surface reading section 109 is provided between the lead rollers 129 and the conveyance rollers 131. The back-surface reading section 109 reads an image on another surface (back surface) of the original. A portion between the lead rollers 129 and the conveyance rollers 131 corresponds to an original reading position 113 at which the back-surface reading section 109 reads the original. A reading glass 119 is provided at the original reading position 113. The original is conveyed between the reading glass 119 and the conveyance path.

The conveyance path is provided with, in order from the upstream in the original conveyance direction, an original presence/absence sensor 17, a separation sensor 10, a double-feed sensor 16, a registration sensor 11, a read sensor 12, and a sheet discharge sensor 13. The original presence/absence sensor 17 detects the originals stacked on the original tray 101. The separation sensor 10 detects an edge portion of the original conveyed on the conveyance path after being separated. When the separation sensor 10 detects the original, a timer count is started. A value of this count is used to determine the timing to start detection by the double-feed sensor 16 or calculate an original length to be described later. The double-feed sensor 16 is used to detect a state in which a plurality of originals are conveyed in an overlapping state (i.e., "double feed", which includes "multi feed") between the separation rollers 122 and the registration rollers 123. The registration sensor 11 detects the edge portion of the original conveyed on the conveyance path on the upstream of the registration rollers 123. The read sensor 12 detects the edge portion of the original on the conveyance path, which is conveyed by the registration rollers 123. The timing to operate the front-surface reading section 201 and the back-surface reading section 109 is determined based on the timing at which the read sensor 12 detects the original. The sheet discharge sensor 13 detects the edge portion of the original conveyed on the conveyance path after being read.

The front-surface reading section 201 and the back-surface reading section 109 have the same configuration. The front-surface reading section 201 includes light emitting diodes (LEDs) 202 serving as light emitters, a lens array 204, and a line sensor 203 serving as a light receiver. The back-surface reading section 109 includes LEDs 110 serving as light emitters, a lens array 112, and a line sensor 111 serving as a light receiver. Each of the line sensors 203 and 111 is formed of, for example, a contact image sensor (CIS), but may be formed of a charge coupled device (CCD) including a reduction optical system using mirrors. The LEDs 202 and 110 are configured to radiate light to the original. The line sensors 203 and 111 are arranged in a direction orthogonal to the original conveyance direction. Thus, in the front-surface reading section 201 and the back-surface reading section 109, the direction orthogonal to the original conveyance direction corresponds to a main scanning direction, and the original conveyance direction corresponds to a sub-scanning direction.

The front-surface reading section 201 causes the LEDs 202 to radiate light to the original passing through the original reading position 107 on the reading glass 130. The light radiated from the LEDs 202 is reflected by a front surface of the original. The reflection light reflected by the front surface of the original is imaged on a light receiving surface of the line sensor 203 by the lens array 204 serving as an optical system. The line sensor 203 outputs image data indicating an image on the front surface of the original in accordance with the imaged reflection light. As described above, the front-surface reading section 201 reads the front surface of the original. The original whose front surface is read is conveyed by the lead rollers 129 to the original reading position 113 of the back-surface reading section 109.

The back-surface reading section 109 performs image reading processing when duplex reading of the original is set. The back-surface reading section 109 causes the LEDs 110 to radiate light to the original passing through the original reading position 113. The light radiated from the LEDs 110 is reflected by a back surface of the original. The reflection light reflected by the back surface of the original is imaged on a light receiving surface of the line sensor 111 by the lens array 112 serving as an optical system. The line sensor 111 outputs image data indicating an image on the back surface of the original in accordance with the imaged reflection light. As described above, the back-surface reading section 109 reads the back surface of the original.

Controller

Figure 3:
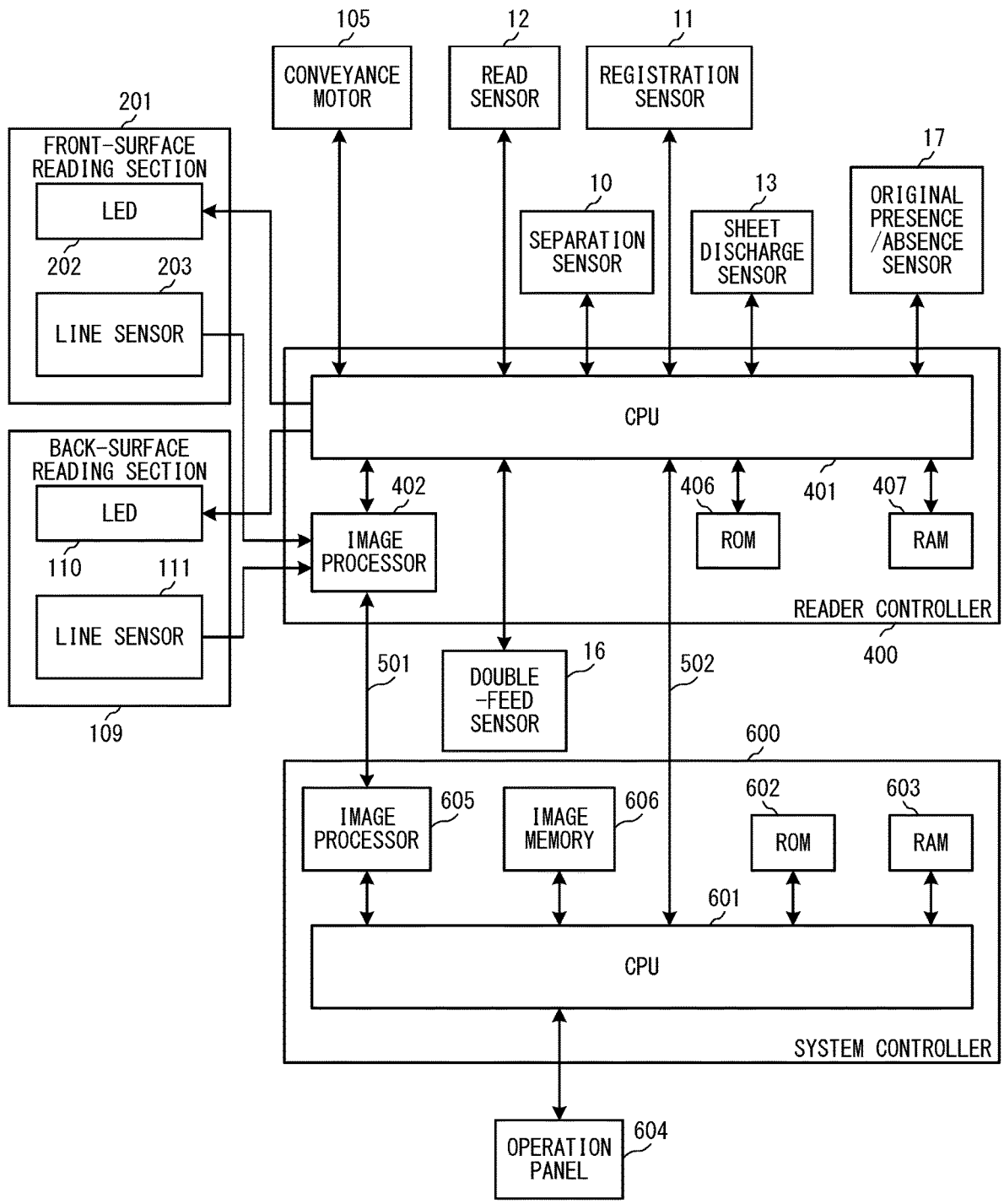
FIG. 3 is a configuration diagram of a controller.

FIG. 3 is a configuration diagram of the controller. The controller includes a reader controller 400 and a system controller 600. The reader controller 400 mainly controls processing related to original conveyance and image reading. The system controller 600 controls the operation of the reader controller 400 to start the image reading and perform image processing onto image data being a reading result. The reader controller 400 and the system controller 600 are connected to each other so as to allow communication therebetween via an image data bus 501 and a command data bus 502.

The reader controller 400 includes a central processing unit (CPU) 401, a read only memory (ROM) 406, and a random access memory (RAM) 407. The CPU 401 executes a computer program stored in the ROM 406 through use of the RAM 407 as a work area, to thereby control the operations of the ADF 120 and the image reading apparatus 100. The reader controller 400 further includes an image processor 402.

The CPU 401 is connected to a conveyance motor 105 configured to drive the rollers for conveyance, in order to achieve an original conveyance function. For example, the registration rollers 123 are connected to the conveyance motor 105 via a clutch for switching between drive and stop. The CPU 401 is connected to the original presence/absence sensor 17, the separation sensor 10, the registration sensor 11, the read sensor 12, the sheet discharge sensor 13, and the double-feed sensor 16. The CPU 401 determines whether or not the originals are in the double-feed state based on the detection result of the double-feed sensor 16.

The conveyance motor 105 in the first embodiment is a pulse motor. The CPU 401 controls the operation of the conveyance motor 105 by the number of drive pulses. A driving force of the conveyance motor 105 is transmitted to the rollers via gears. Each roller is rotated by the driving force transmitted thereto to convey the original. The CPU 401 is thus capable of detecting a conveyance distance of the original being conveyed from the number of drive pulses. The CPU 401 performs original conveyance control by controlling loads of the rollers and the like based on the detection results of the sensors and the conveyance distance calculated from the number of drive pulses of the conveyance motor 105. A DC brushless motor may be used in place of the pulse motor so that the conveyance distance can be obtained through use of pulses output from a pulse encoder provided in the DC brushless motor. The drive pulse of the pulse motor and the pulse output from the pulse encoder are both pulses synchronized with the drive of the motor.

In order to achieve the image reading function, the CPU 401 is connected to the LEDs 202 and the line sensor 203 of the front-surface reading section 201, and to the LEDs 110 and the line sensor 111 of the back-surface reading section 109. The CPU 401 causes the LEDs 202 or 110 to emit light in accordance with the timing at which the original is conveyed to the reading position, to thereby cause the line sensor 203 or 111 to output image data. The image processor 402 performs various types of image processing on the image data, and transmits the image data subjected to image processing to the system controller 600 via the image data bus 501. The CPU 401 transmits a vertical synchronization signal being a reference of a leading edge of the image data and a horizontal synchronization signal being a reference of a pixel leading end of one line to the system controller 600 via the command data bus 502 in accordance with the timing at which the image is read.

The system controller 600 includes a CPU 601, a ROM 602, a RAM 603, an image processor 605, and an image memory 606. The system controller 600 is connected to an operation panel 604. The CPU 601 executes a computer program stored in the ROM 602 through use of the RAM 603 as a work area, to thereby control the operation of the system controller 600. The CPU 601 transmits and receives data related to image reading to and from the CPU 401 via the command data bus 502. The image processor 605 performs predetermined image processing, for example, color determination with respect to the image data received from the image processor 402 via the image data bus 501. The image processor 605 stores the image data subjected to image processing to the image memory 606.

The operation panel 604 is a user interface including an input device and an output device. Examples of the input device include input keys and a touch panel. Examples of the output device include a display device. The operation panel 604 transmits an instruction or setting input to the input device to the CPU 601. The operation panel 604 is controlled by the CPU 601 to, for example, display an image on the display device.

Double-Feed Detection

Figure 4:
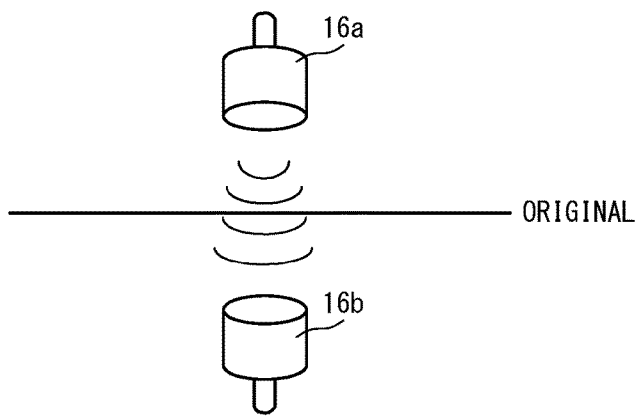
FIG. 4 is an explanatory view of a double-feed sensor.

FIG. 4 is an explanatory view of the double-feed sensor 16. The double-feed sensor 16 includes an ultrasonic transmitting sensor 16a and an ultrasonic receiving sensor 16b. The ultrasonic transmitting sensor 16a is configured to transmit an ultrasonic wave. The ultrasonic receiving sensor 16b is configured to receive the ultrasonic wave. The ultrasonic transmitting sensor 16a is arranged at a position at which an ultrasonic wave is transmitted toward the conveyance path. The ultrasonic receiving sensor 16b is arranged at a position across the conveyance path at which the ultrasonic wave transmitted from the ultrasonic transmitting sensor 16a can be received.

The ultrasonic transmitting sensor 16a is controlled by the CPU 401 to transmit an ultrasonic wave. The ultrasonic wave transmitted from the ultrasonic transmitting sensor 16a passes and propagates through the original being conveyed to be received by the ultrasonic receiving sensor 16b. The ultrasonic receiving sensor 16b outputs an analog electrical signal having a voltage amplitude corresponding to the intensity of the received ultrasonic wave. The CPU 401 acquires the analog electrical signal from the ultrasonic receiving sensor 16b, and amplifies the analog electrical signal to convert the amplified analog electrical signal into a digital signal. The CPU 401 determines the occurrence of the double feed of the originals based on this digital signal.

The CPU 401 causes the double-feed sensor 16 to successively perform a plurality of times of detecting operations to make determination on the double feed based on a plurality of digital signals corresponding to detection results. This operation is performed in order to remove influences of a usage environment of the double-feed sensor 16 (for example, mounting position, temperature, and humidity) and extrinsic noise, and to suppress an influence of a time period for converting the analog electrical signal into the digital signal. The original is conveyed during the plurality of times of detecting operations. The double feed of the originals is detected at a plurality of detecting points in the conveyance direction.

Figure 5A:
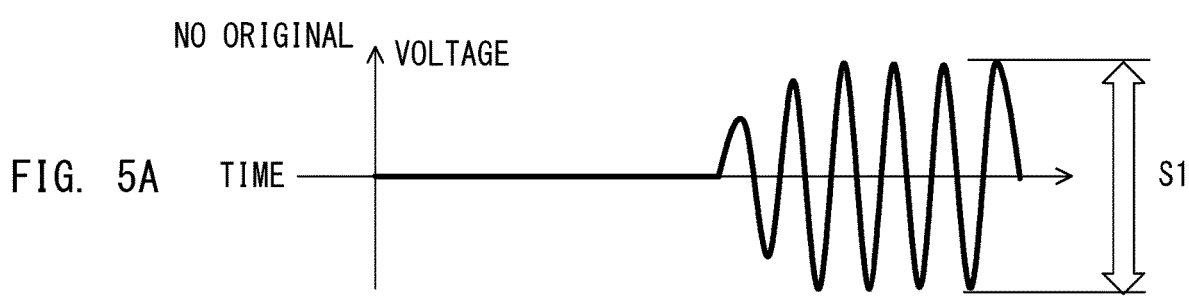
FIG. 5A, FIG. 5B, and FIG. 5C are explanatory diagrams of analog electrical signals.
Figure 5B:
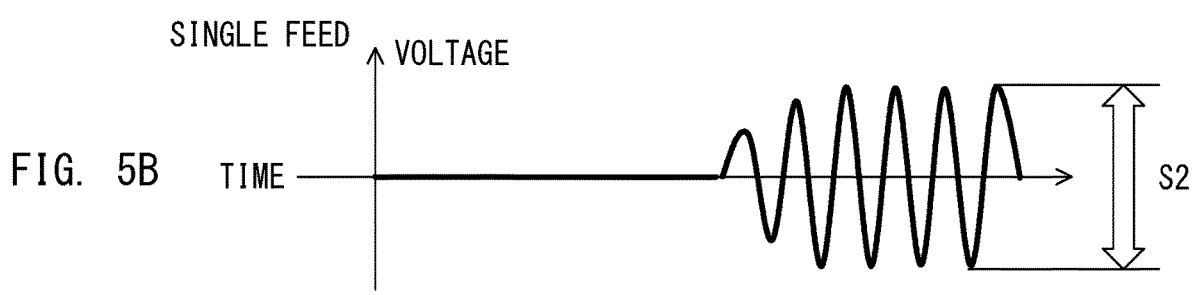
Figure 5C:
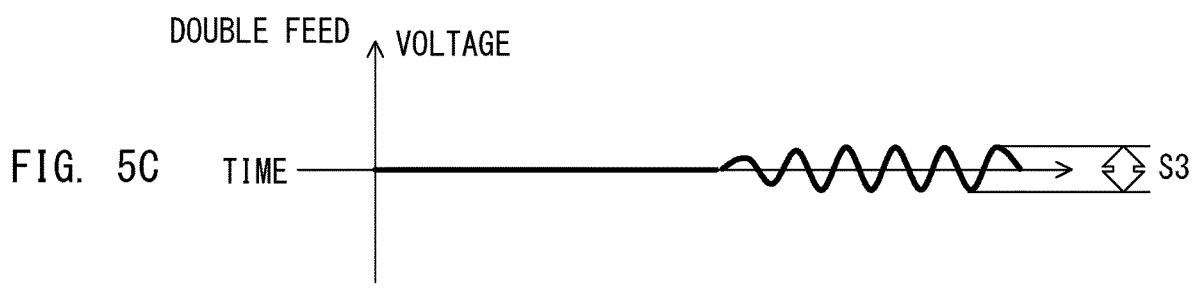

A state in which the originals are separated one by one and conveyed through the conveyance path without overlapping each other is referred to as "single feed", and a state in which the originals are not separated one by one and are conveyed through the conveyance path in an overlapping state is referred to as "double feed". FIG. 5A to FIG. are explanatory diagrams of analog electrical signals output from the double-feed sensor 16 (ultrasonic receiving sensor 16b). FIG. 5A is an illustration of a waveform of an analog electrical signal under a state in which no original is present (original absent state) between the ultrasonic transmitting sensor 16a and the ultrasonic receiving sensor 16b. FIG. 5B is an illustration of a waveform of an analog electrical signal under a single-feed state in which only one original is conveyed. FIG. 5C is an illustration of a waveform of an analog electrical signal under the double-feed state.

In the original absent state, the ultrasonic wave transmitted from the ultrasonic transmitting sensor 16a is received by the ultrasonic receiving sensor 16b without being attenuated by the original. Thus, the ultrasonic receiving sensor 16a outputs an analog electrical signal having an amplitude S1 without attenuation. In the single-feed state, the ultrasonic receiving sensor 16b receives an ultrasonic wave attenuated by an amount corresponding to one original, and hence outputs an analog electrical signal having an amplitude S2 attenuated as compared to the case of the original absent state (amplitude S1). In the double-feed state, the ultrasonic receiving sensor 16b receives an ultrasonic wave further attenuated by a plurality of originals and an air layer formed between those originals, and hence outputs an analog electrical signal having an amplitude S3 further attenuated as compared to the case of the single-feed state (amplitude S2). The CPU 401 compares the amplitude of the analog electrical signal acquired from the ultrasonic receiving sensor 16b with a predetermined threshold value, to thereby allow detection of the double feed of the originals.

The attenuation amount of the ultrasonic wave varies depending on the thickness and the type of the original. However, as compared to the variation in attenuation amount of the ultrasonic wave caused by the difference in thickness and type of the original, the double feed causes an overwhelmingly large difference in attenuation amount of the ultrasonic wave. The CPU 401 is thus capable of detecting the double feed of the originals based on the amplitude of the analog electrical signal acquired from the ultrasonic receiving sensor 16b without being affected by the difference in thickness and type of the original.

Double-Feed Determination Processing 1

Figure 6A:
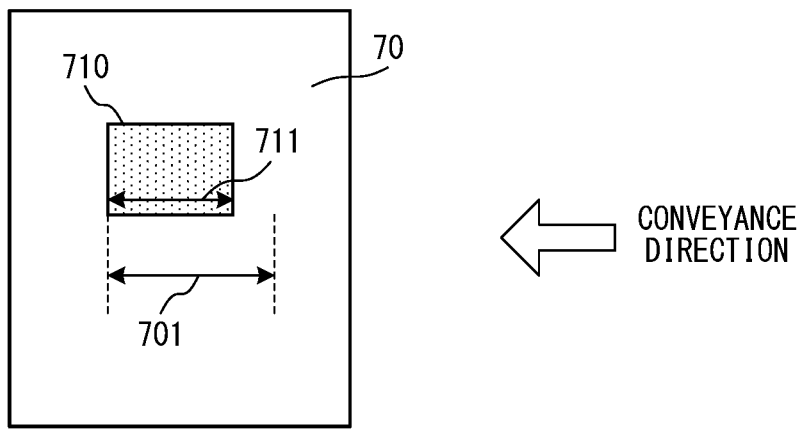
FIG. 6A, FIG. 6B, and FIG. 6C are explanatory views for illustrating double-feed determination processing.
Figure 6B:
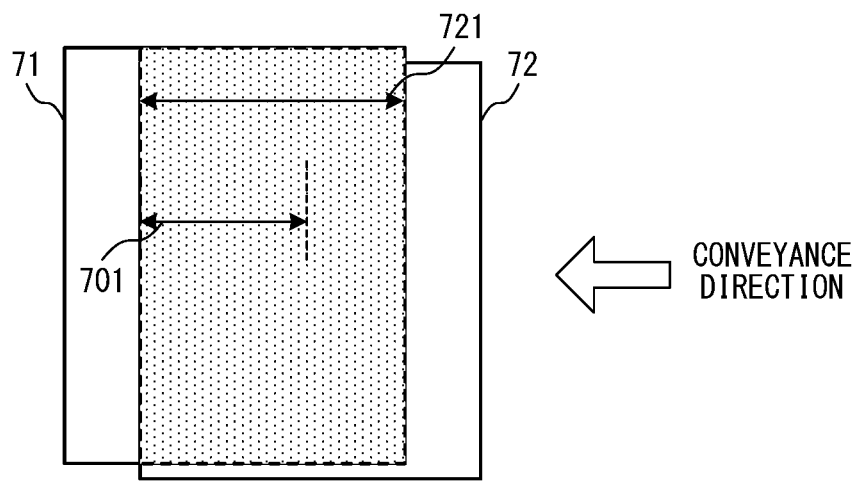
Figure 6C:
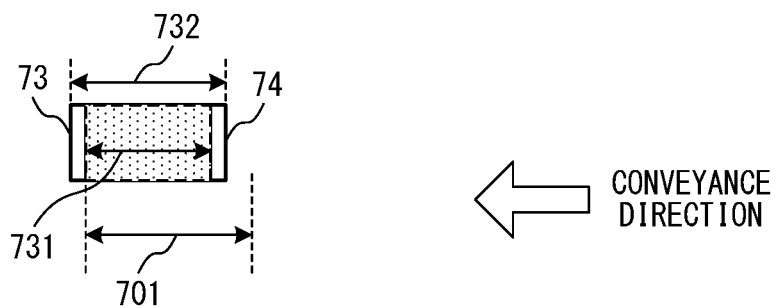

In this processing, the CPU 401 determines that the originals are in the double-feed state in a case where a double-feed length corresponding to a length of an overlapping region in the conveyance direction is equal to or larger than a predetermined length. FIG. 6A to FIG. 6C are explanatory views for illustrating the double-feed determination processing. FIG. 6A is an illustration of an original 70 having a label or other paper pieces 710 attached thereto. This original 70 is detected to have an overlap in a part at which the paper piece 710 is attached. However, a double-feed length 711 is smaller than a predetermined length 701. The CPU 401 thus does not determine that the original 70 is in the double-feed state even when acquiring an analog electrical signal having an attenuated amplitude. In contrast, in FIG. 6B, a double-feed length 721 of two successively-conveyed originals 71 and 72 is larger than the predetermined length 701. The CPU 401 thus determines that the originals 71 and 72 are in the double-feed state.

The double-feed length can be measured in accordance with the number of drive pulses of the conveyance motor 105 configured to drive the separation rollers 122, in a case where the analog electrical signal has an amplitude equal to or smaller than an amplitude (amplitude S2) used to make determination as double feed. That is, the CPU 401 acquires the double-feed length in accordance with the number of drive pulses of the conveyance motor 105 in a case where the analog electrical signal acquired from the ultrasonic receiving sensor 16b has an amplitude equal to or smaller than the amplitude S2. The CPU 401 can also measure an original length corresponding to a length in the conveyance direction of an original being conveyed, in accordance with the number of drive pulses of the conveyance motor 105. For example, the CPU 401 can measure the original length based on the number of drive pulses of the conveyance motor 105 from when the separation sensor 10 detects the original until when the separation sensor 10 no longer detects the original (from leading-edge detection to trailing-edge detection), and on the original conveyance speed.

Figure 7:
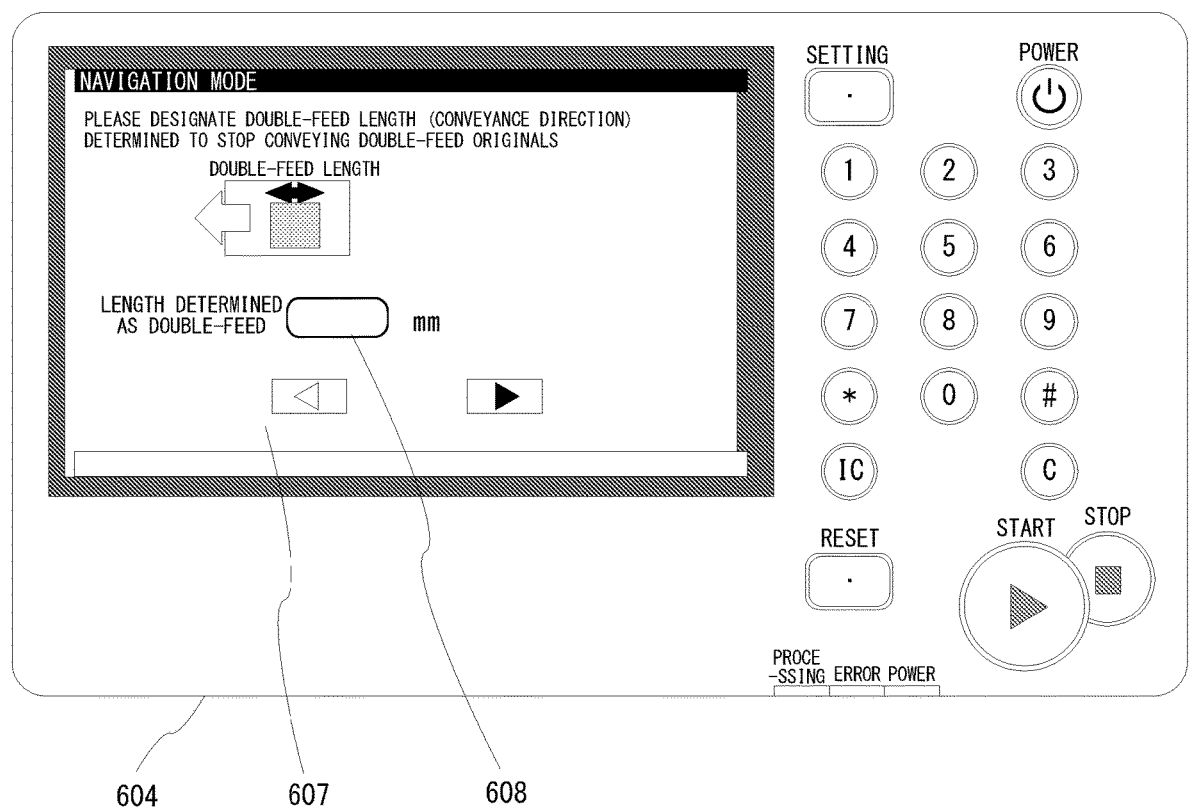
FIG. 7 is an exemplary view of an input screen.

The predetermined length 701 may be set by a user through use of the operation panel 604. FIG. 7 is an exemplary view of an input screen for inputting the predetermined length 701. The user can input the predetermined length into a predetermined-length input field 608 of an input screen 607 through use of numeric keys or the like. The user inputs, as a predetermined value, a value larger than the length in the conveyance direction of the paper piece 710 in a case where the user desires to prevent the original 70 having the paper piece 710 attached thereto from being determined as double feed. For example, in a case where the maximum length of the paper piece 710 to be used is 80 mm, the user may input a value of about 90 mm as the predetermined length. In this manner, the image reading apparatus 100 can read the original 70 having the paper piece 710 attached thereto in the same manner as the original conveyed in the single-feed state.

Double-Feed Determination Processing 2

In this processing, the CPU 401 determines the double feed of the originals based on the double-feed length and the original length. FIG. 6C is an illustration of two business cards 73 and 74 in the double-feed state. In FIG. 6C, a relationship between a double-feed length 731 and the predetermined length 701 is similar to that in the case of FIG. 6A. The CPU 401 thus does not determine the state of FIG. 6C as the double-feed state in the case of processing similar to "double-feed determination processing 1". In view of this, in FIG. 6C, an original length 732 is added as a condition for determining the double feed. The original length is detected as a length in the conveyance direction of one original in a case where the original is conveyed in the single-feed state. However, as exemplified in FIG. 6C, when the double feed occurs, the original length is detected as a length in the conveyance direction of the whole overlapping originals.

In this case, the CPU 401 determines that the originals (business cards 73 and 74) are in the double-feed state in a case where the double-feed length 731 is smaller than the predetermined length 701 and also in a case where the original length 732 is smaller than the predetermined length 701. In this manner, the CPU 401 does not make determination as double feed in a case where an original having a predetermined size or more has a label attached thereto, and can make determination as double feed in a case where a plurality of small-sized originals such as business cards overlap each other.

In the above-mentioned double-feed determination processing, the predetermined length 701 to be used as a threshold value for determining the double feed is directly used for comparison with the original length 732. However, the threshold value for determining the double feed and a determination reference for the size of the original (comparison value with the original length 732) are not required to be the same value. Different values may be set thereto.

Figure 8:
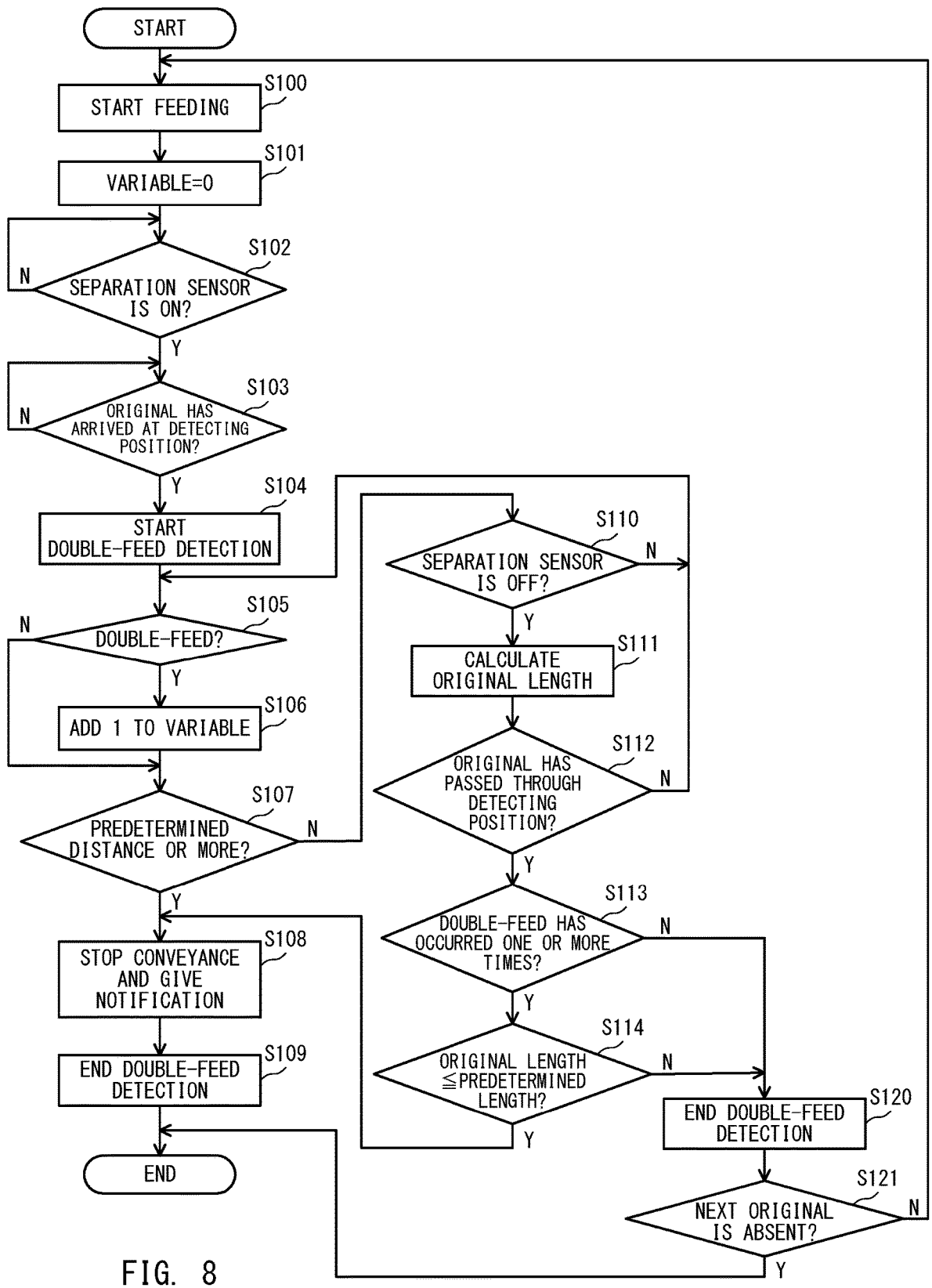
FIG. 8 is a flow chart for illustrating original conveyance processing.

FIG. 8 is a flow chart for illustrating original conveyance processing to be performed in a case where an original image is read through use of the ADF 120. Double-feed detection processing is performed during the original conveyance processing. The CPU 401 starts this processing in response to an instruction from the CPU 601 having received as input an instruction to read the original image from the operation panel 604.

The CPU 401 controls the conveyance motor 105 in accordance with the instruction from the CPU 601 to start feeding of the original placed on the original tray 101 by the pick-up roller 121 and the separation rollers 122 (Step S100). The CPU 401 sets a variable indicating the number of times that the double feed has been detected to "0" (Step S101). The CPU 401 waits until the separation sensor 10 detects the original (turns on) (Step S102: N). In a case where the separation sensor 10 detects the original (Step S102: Y), the CPU 401 determines whether or not the original has arrived at a double-feed detecting position at which the double-feed sensor 16 detects the double feed (Step S103). Whether or not the original has arrived at the double-feed detecting position at which the double-feed sensor 16 detects the double feed is determined based on, for example, an elapsed time from when the separation sensor 10 detects the original.

In a case where the original has arrived at the double-feed detecting position (Step S103: Y), the CPU 401 starts the double-feed detection processing by the double-feed sensor 16 (Step S104). The double-feed sensor 16 periodically performs the double-feed detection processing to periodically output an analog electrical signal. The CPU 401 periodically acquires the analog electrical signal to determine whether or not the double-feed state has occurred based on the analog signal for each or every acquisition (Step S105). It is also possible to employ a configuration in which an analog signal is converted into a digital signal by an A/D converter and then input to the CPU 401. When it is determined that the double-feed state has occurred (Step S105: Y), the CPU 401 adds 1 to the variable indicating the number of times that the double-feed state has been detected (Step S106). When it is not determined that the double-feed state has occurred (Step S105: N), the variable is not changed.

Next, the CPU 401 determines whether or not a distance of the double-feed state (double-feed length) is equal to or larger than a predetermined distance based on the variable indicating the number of times that the double feed has been detected (Step S107). The CPU 401 determines that the distance in which the double feed has been determined is equal to or larger than the predetermined distance in a case where the variable is equal to or larger than a predetermined value. In a case where the original conveyance speed is constant, the variable indicates the double-feed length. The predetermined value is determined based on a distance calculated from, for example, a cycle of the double-feed detection processing and the original conveyance speed. As described above, the double-feed length may be measured in accordance with the number of drive pulses of the conveyance motor 105.

In a case where the variable is equal to or larger than the predetermined value, the CPU 401 determines that the distance in which the double feed has been determined is equal to or larger than the predetermined distance (Step S107: Y). In this case, the CPU 401 determines that the double-feed state has occurred and thus the original conveyance is required to be stopped. The CPU 401 stops the conveyance motor 105 to stop the original conveyance, and notifies the user of the original conveyance stop by the operation panel 604 (Step S108). After that, the CPU 401 ends the double-feed detection processing (Step S109) to end the original conveyance processing.

In a case where the variable is smaller than the predetermined value, the CPU 401 determines that the distance in which the double feed has been determined is smaller than the predetermined distance (Step S107: N). In this case, the CPU 401 determines whether or not the separation sensor 10 no longer detects the original (brought into an off-state) (Step S110). In a case where the separation sensor 10 is not brought into the off-state (Step S110: N), the CPU 401 repeats the processing of Step S105 and the subsequent steps. In a case where the separation sensor 10 is brought into the off-state (Step S110: Y), the CPU 401 calculates the original length (Step S111). The CPU 401 calculates the original length by, for example, multiplying the number of drive pulses of the conveyance motor 105 during a period in which the separation sensor 10 detects the original by an original conveyance distance obtained by one pulse of the conveyance motor 105. Besides, in a case where the original conveyance speed is constant, the CPU 401 can calculate the original length by multiplying a time period during which the separation sensor 10 detects the original by the conveyance speed.

The CPU 401 that has calculated the original length determines whether or not the trailing edge of the original has passed through the double-feed detecting position at which the double-feed sensor 16 detects the double feed (Step S112). Whether or not the original has passed through the double-feed detecting position at which the double-feed sensor 16 detects the double feed is checked based on, for example, whether or not the amplitude of the analog signal acquired from the ultrasonic receiving sensor 16a is the amplitude S1 without attenuation. In a case where the trailing edge of the original has not passed through the double-feed detecting position at which the double-feed sensor 16 detects the double feed (Step S112: N), the CPU 401 repeats the processing of Step S105 and the subsequent steps.

In a case where the trailing edge of the original has passed through the double-feed detecting position at which the double-feed sensor 16 detects the double feed (Step S112: Y), the CPU 401 determines whether or not the variable indicating the number of times that the double feed has been detected is 1 or more (Step S113). That is, the CPU 401 determines whether or not the double feed has been detected one or more times. In a case where the double feed has been detected one or more times (Step S113: Y), the CPU 401 determines whether or not the original length calculated in the processing of Step S111 is equal to or smaller than a predetermined length (Step S114). The predetermined length is, for example, 91 mm. This length is a longitudinal length of a general business card, but the predetermined length is not limited thereto. In a case where the original length is equal to or smaller than the predetermined length (Step S114: Y), the CPU 401 determines that the business cards are in the double-feed state. In this case, the CPU 401 stops the original conveyance, and notifies the user of the original conveyance stop by the operation panel 604 (Step S108). After that, the CPU 401 ends the double-feed detection processing (Step S109) to end the original conveyance processing.

In a case where the original length is larger than the predetermined length (Step S114: N), it is inferred that the original is conveyed with a paper piece being attached thereto. In this case, the CPU 401 ends the double-feed detection processing (Step S120). In a case where the number of times that the double feed has been detected is 0 (Step S113: N), the CPU 401 determines that the double feed has not occurred. Also in this case, the CPU 401 ends the double-feed detection processing (Step S120). The CPU 401 that has ended the double-feed detection processing determines the presence or absence of a next original on the original tray 101 based on the detection result of the original presence/absence sensor 17 (Step S121). In a case where the next original is present (Step S121: N), the CPU 401 performs the processing of Step S100 and the subsequent steps again. In a case where the next original is absent (Step S121: Y), the CPU 401 ends the original conveyance processing.

Second Embodiment

Figure 9A:
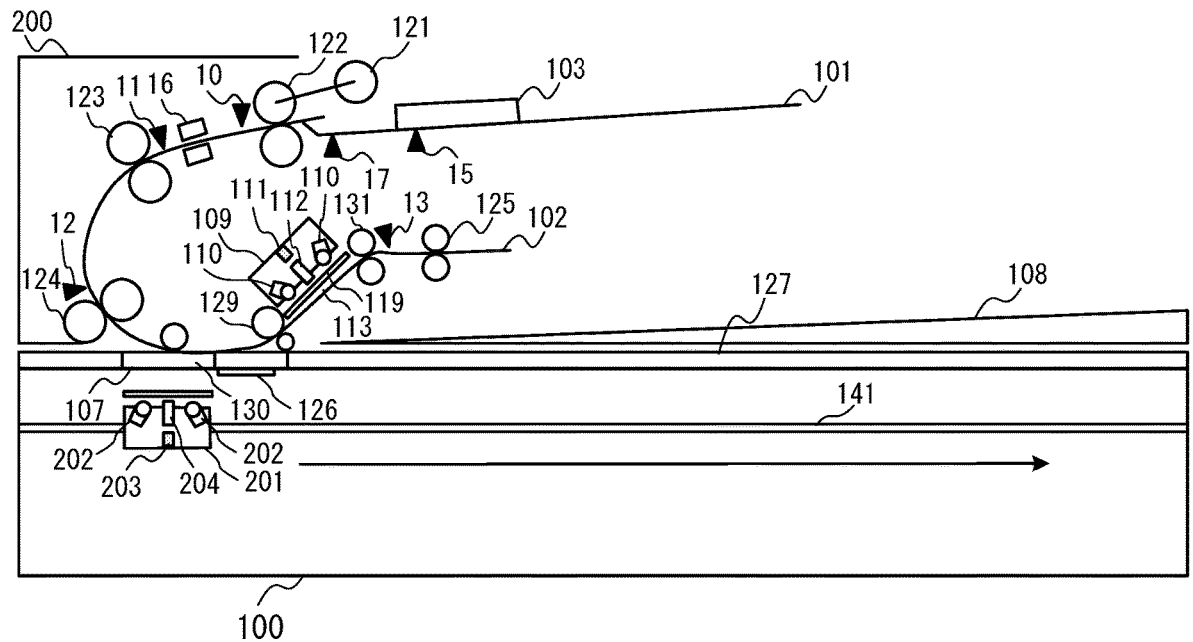
FIG. 9A and FIG. 9B are explanatory views of an image reading apparatus.
Figure 9B:
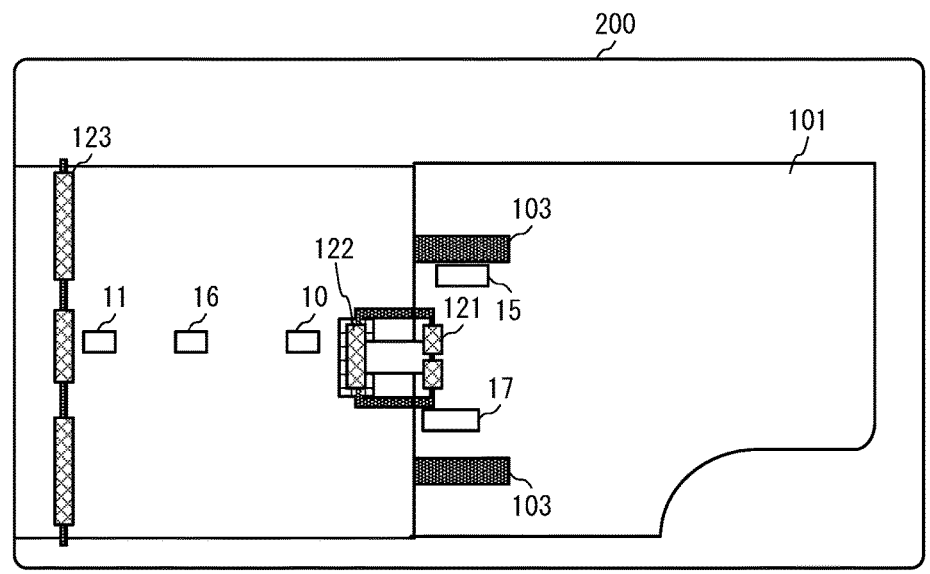
Figure 10:
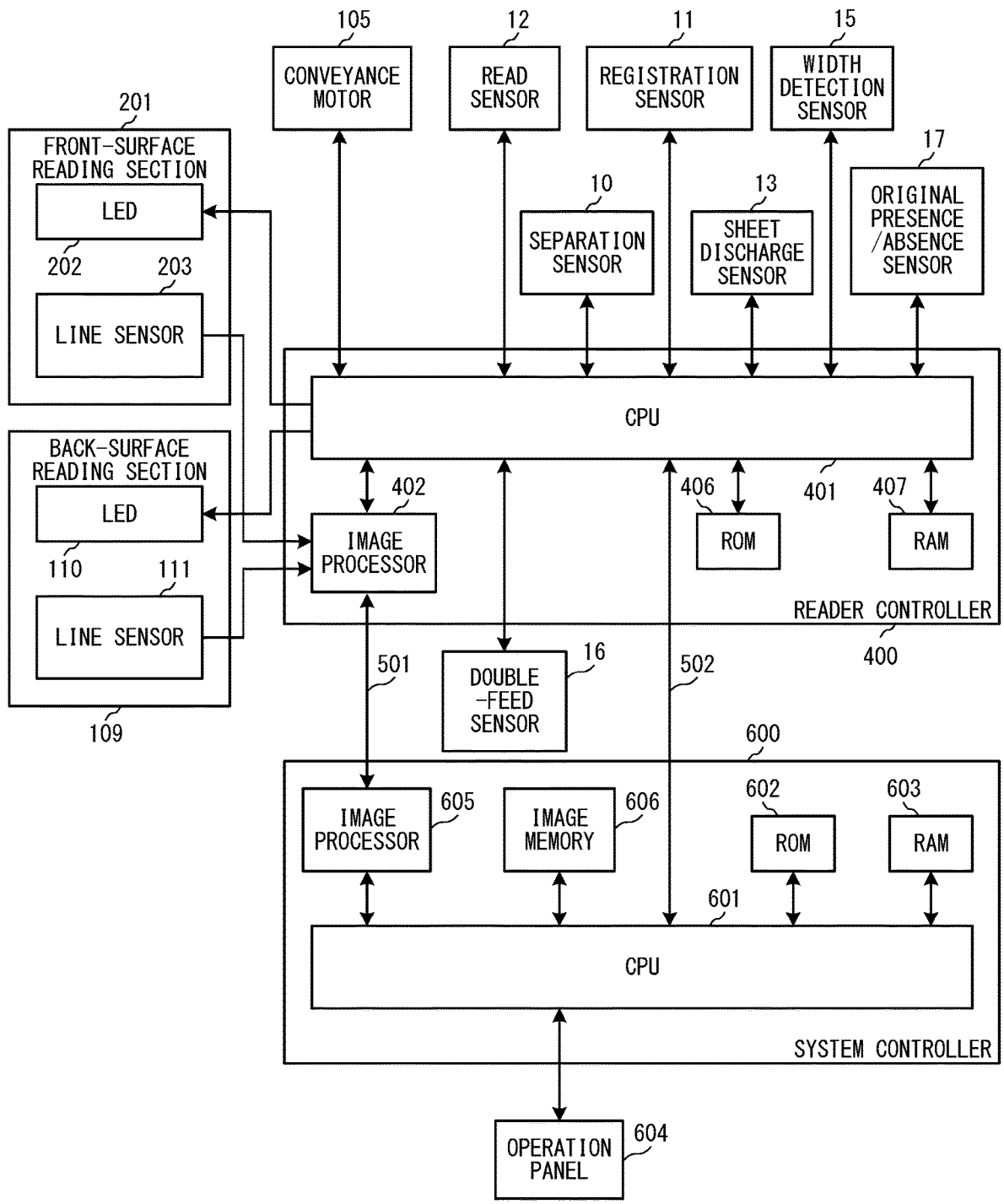
FIG. 10 is a configuration diagram of a controller.

In the first embodiment, the original length is used as the condition for determining the double feed. In a second embodiment of the present disclosure, a width (length in the main scanning direction) of the original is used as the condition for determining the double feed. FIG. 9A and FIG. 9B are explanatory views of an image reading apparatus 100 including an ADF 200 of the second embodiment. FIG. 9A is an interior configuration view of the image reading apparatus 100 including the ADF 200. FIG. 9B is a top view of the ADF 200. FIG. 10 is a configuration diagram of a controller in the second embodiment.

The ADF 200 of the second embodiment differs from the ADF 120 of the first embodiment in that a width sensor 15 is provided in the vicinity of the width regulating plates 103. The width sensor 15 is configured to detect positions of the width regulating plates 103. Other configurations are similar between the first embodiment and the second embodiment. The width sensor 15 is connected to the CPU 401.

A distance between the two width regulating plates 103 is detected based on the detection result of the width sensor 15. Thus, in a case where the user places an original on the original tray 101 and adjusts the width regulating plates 103 to the width of the original, the width (length in the main scanning direction) of the placed original is detected. A size as a standard size of the original placed on the original tray 101 can be determined based on the detection result of the width sensor 15 (original width). The width sensor 15 is formed of, for example, a reflector-type sensor including a photo-interrupter and a flag for blocking light, an optical sensor, or a volume sensor.

Double-Feed Determination Processing

Figure 11A:
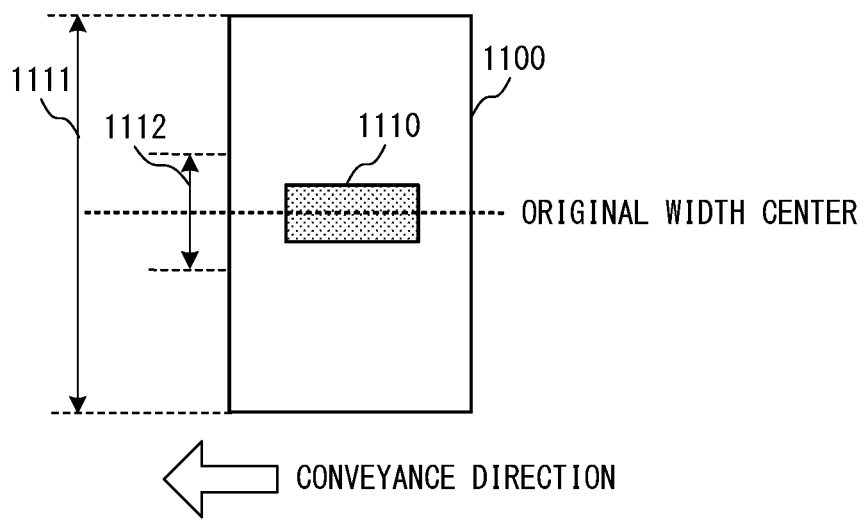
FIG. 11A and FIG. 11B are explanatory diagrams for illustrating double-feed determination processing.
Figure 11B:
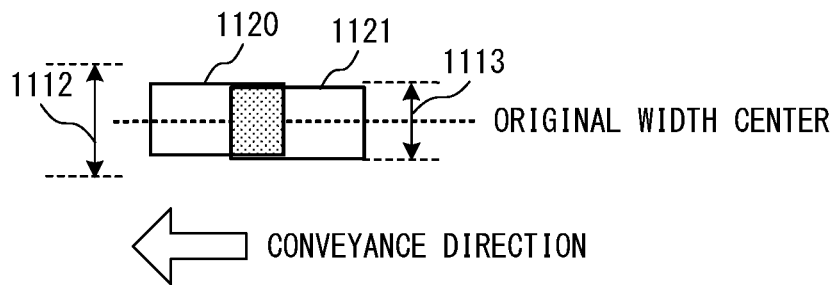

FIG. 11A and FIG. 11B are explanatory views for illustrating the double-feed determination processing. FIG. 11A is an illustration of an original 1100 having a label or other paper pieces 1110 attached thereto. FIG. 11B is an illustration of a state in which two business cards 1120 and 1121 are conveyed while partially overlapping each other. In a case where the double-feed sensor 16 detects the double feed one or more times, the detection result of the width sensor 15 is used for determining the double feed.

In FIG. 11A, an original width 1111 is larger than a predetermined width 1112, and hence it is inferred that the paper piece 1110 is attached to an original having a standard size or the like larger than a business card. The CPU 401 thus does not determine that the originals are in the double-feed state. In FIG. 11B, an original width 1113 is smaller than the predetermined width 1112. It is thus inferred that two business cards are partially overlapping each other. The CPU 401 thus determines that the originals are in the double-feed state.

Figure 12:
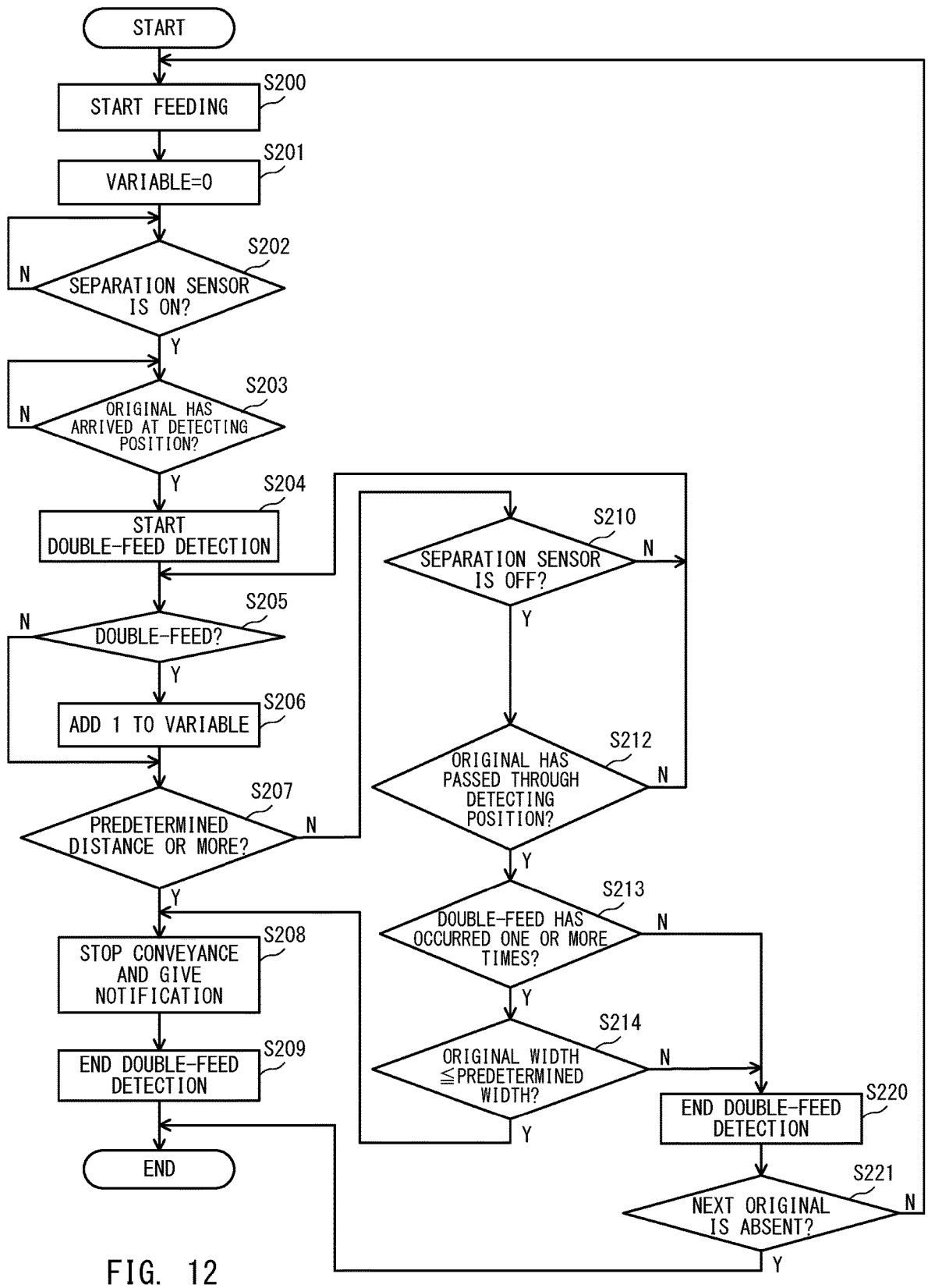
FIG. 12 is a flow chart for illustrating original conveyance processing.

FIG. 12 is a flow chart for illustrating original conveyance processing to be performed in a case where an original image is read through use of the ADF 200. Double-feed detection processing is performed during the original conveyance processing. The CPU 401 starts this processing in response to an instruction from the CPU 601 having received as input an instruction to read the original image from the operation panel 604. Processing of from Steps S200 to S209 and Step S210 is similar to the processing of from Steps S100 to S109 and Step S110 of FIG. 8, and hence description thereof is omitted.

In a case where the separation sensor 10 does not detect the original and is brought into the off-state (Step S210: Y), the CPU 401 determines whether or not the trailing edge of the original has passed through the double-feed detecting position at which the double-feed sensor 16 detects the double feed (Step S212). At this time, the CPU 401 does not calculate the original length unlike the first embodiment. Processing of Steps S212 and S213 is similar to the processing of Steps S112 and S113 of FIG. 8, and hence description thereof is omitted.

In a case where the double feed has been detected one or more times (Step S213: Y), the CPU 401 determines whether or not the original width detected through use of the width sensor 15 is equal to or smaller than a predetermined width (Step S214). The original width is detected at a time point at which, before the sheet feed is started, the original is placed on the original tray 101 and is regulated in the main scanning direction by the width regulating plates 103. The predetermined width is, for example, 55 mm. This width is a transverse length of a general business card, but the predetermined width is not limited thereto. In a case where the original width is equal to or smaller than the predetermined width (Step S214: Y), the CPU 401 determines that originals having a business card size are conveyed. In this case, the CPU 401 stops the original conveyance, and notifies the user of the original conveyance stop by the operation panel 604 (Step S208). After that, the CPU 401 ends the double-feed detection processing (Step S209) to end the original conveyance processing. In a case where the original width is larger than the predetermined width (Step S2114: N), the CPU 401 infers that an original having a standard size or the like larger than the business card is conveyed with a paper piece being attached thereto. In this case, the CPU 401 performs processing of Steps S220 and S221 similar to Steps S120 and S121 of FIG. 8 to end the original conveyance processing.

In the second embodiment, description has been given of a case in which the original width detected based on the width regulating plates 103 is used as the condition for determining the double feed, but the original length may be used in combination as the determination condition. That is, the first embodiment and the second embodiment may be combined to each other so that the original size (size in the main scanning direction and size in the sub-scanning direction) is used as the condition for determining the double feed.

Third Embodiment

Figure 13A:
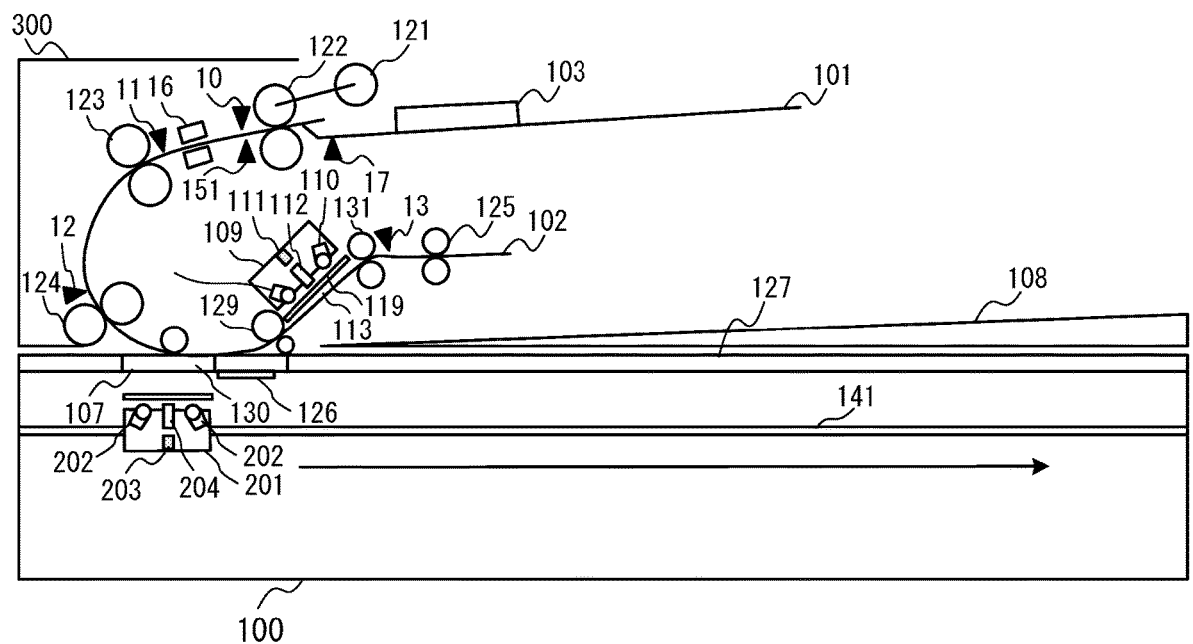
FIG. 13A and FIG. 13B are explanatory views of an image reading apparatus.
Figure 13B:
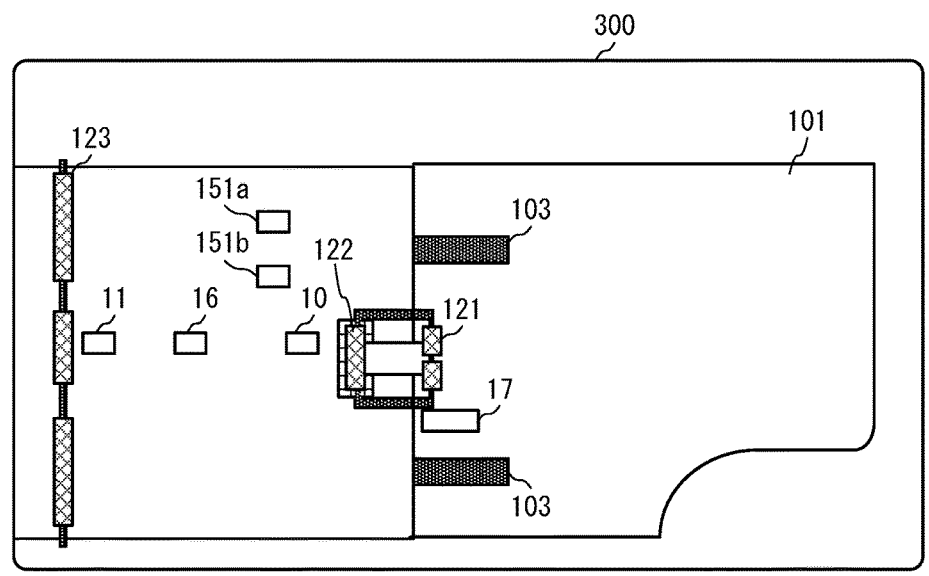

In the second embodiment, the original width of the original placed on the original tray 101 is used as the condition for determining the double feed, but in a third embodiment of the present disclosure, the original width detected from the original being conveyed is used as the condition for determining the double feed. FIG. 13A and FIG. 13B are explanatory views of an image reading apparatus 100 including an ADF 300 of the third embodiment. FIG. 13A is an interior configuration view of the image reading apparatus 100 including the ADF 300. FIG. 13B is a top view of the ADF 300.

The ADF 300 of the third embodiment includes width sensors 151 configured to detect the original width. The width sensors 151 are provided in a conveyance path through which the original is conveyed. A plurality of width sensors 151 are provided side by side in the main scanning direction. In the third embodiment, two width sensors 151 (width sensors 151a and 151b) are provided side by side at a first position and a second position in the main scanning direction. The width sensor 151a is arranged at a position farther from the center in the main scanning direction than the width sensor 151b. Both of the width sensors 151a and 151b are configured to detect the original being conveyed. When the width sensors 151a and 151b are provided in the conveyance path, even in a case in which a plurality of originals having different sizes are placed on the original tray 101, the original width can be detected from the original being conveyed. The original presence/absence sensor 17 is provided at a position at which the original presence/absence sensor 17 can detect placement of an original having a business card size on the original tray 101. The original width is detected based on an original detection result of each of the width sensor 151a and the width sensor 151b. The width sensors 151a and 151b are each formed of, for example, a reflector-type sensor including a photo-interrupter and a flag for blocking light, or an optical sensor.

The CPU 401 detects the original width based on the detection result of each of the width sensors 151a and 151b on condition that the original presence/absence sensor 17 detects the original before the original conveyance is started. FIG. 14 is an explanatory table for showing original width detection with reference to the detection results of the width sensors 151a and 151b. In this case, description is given on the assumption that the width sensors 151a and 151b are turned on when detecting the original. In a case where the width sensors 151a and 151b are both in the off-state, it is determined that an original having a business card size is conveyed. In a case where the width sensor 151a is in the off-state and the width sensor 151b is in the on-state, it is determined that a standard-size original A (for example, B6 size) larger than the business card is conveyed. In a case where the width sensors 151a and 151b are both in the on-state, it is determined that a standard-size original B (for example, A4 size) larger than the standard-size original A is conveyed. In a case where the width sensor 151a is in the on-state and the width sensor 151b is in the off-state, the width sensors 151 may be out of order (sensor failure). In this case, it is determined that the width sensors 151 are out of order, or when the conveyance is continued, an original equal to or larger than the standard-size original B is conveyed.

The double-feed detection processing of this case is similar to that in the second embodiment (processing of FIG. 12). The original width is detected after the separation sensor 10 detects the original while the original is conveyed to the double-feed detecting position of the double-feed sensor 16. This processing corresponds to processing between Steps S202 and S203 in the flow chart of FIG. 12.

Fourth Embodiment

In a fourth embodiment of the present disclosure, the original width is detected based on a result obtained by the image processor 402 processing the image of the original read by the line sensor 203, and the detected original width is used as the condition for determining the double feed. The configurations of the ADF 120 and the image reading apparatus 100 are similar to those in the first embodiment.

In a case where the original width is detected from the image of the original, it is required to extract an edge of an original from an image read by the line sensor. In order to extract the edge, a change from a state in which an original is absent at the reading position of the front-surface reading section 201 to a state in which an original is present thereat is required to be successively monitored. The front-surface reading section 201 thus starts to read the image at a timing earlier than the timing at which the original is conveyed to the reading position of the front-surface reading section 201 after being detected by the read sensor 12. For example, the front-surface reading section 201 starts to read the image at a time point at which the original has arrived at a position on the upstream by 10 mm from the original reading position 107 of the front-surface reading section 201. The front-surface reading section 201 reads the image by each line. The CPU 401 detects, from the reading result, a shadow of an original edge caused by the thickness of the original, to thereby extract the edge of the original. The edge determination processing is not limited to the shadow of the original edge, and may be performed based on an image extracted based on a difference between reading results of a white member provided on a surface facing the front-surface reading section 201 and a basic color of the original. The CPU 401 detects the original width of the original based on the extracted edge.

In the fourth embodiment, the original width can be detected based on the read image, and hence the width sensors 15 and 151 used in the second embodiment and the third embodiment are not required to be provided. An image of the original read by the back-surface reading section 109 may also be subjected to similar processing so that the image can be used for detection of the original width.

Figure 15:
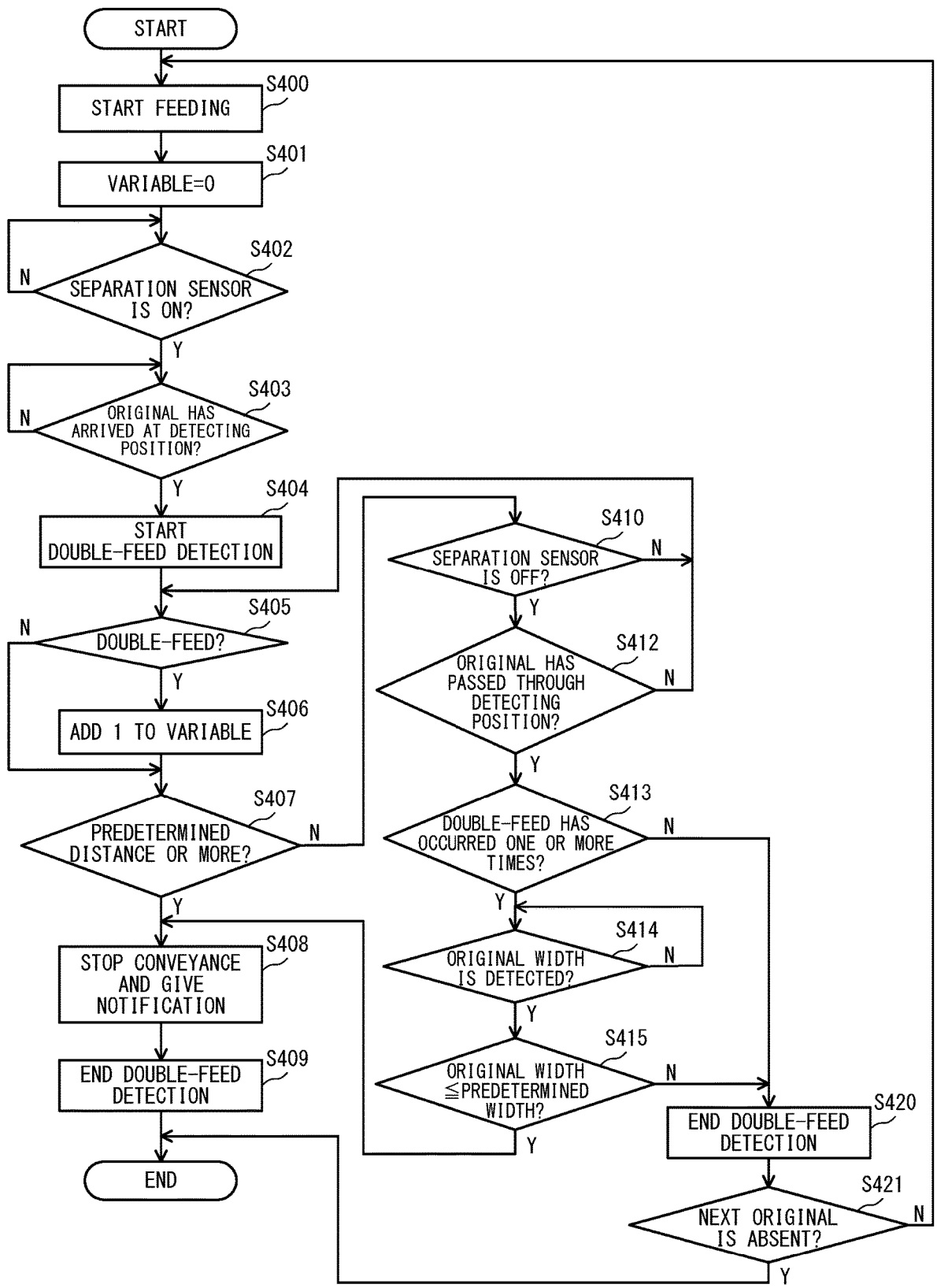
FIG. 15 is a flow chart for illustrating original conveyance processing.

FIG. 15 is a flow chart for illustrating original conveyance processing to be performed in a case where an original image is read through use of the ADF 120. Double-feed detection processing is performed during the original conveyance processing. The CPU 401 starts this processing in response to an instruction from the CPU 601 having received as input an instruction to read the original image from the operation panel 604. Processing of from Steps S400 to S409 and Step S410 is similar to the processing of from Steps S100 to S109 and Step S110 of FIG. 8, and hence description thereof is omitted.

In a case where the separation sensor 10 does not detect the original and is brought into the off-state (Step S410: Y), the CPU 401 determines whether or not the trailing edge of the original has passed through the double-feed detecting position at which the double-feed sensor 16 detects the double feed (Step S412). At this time, the CPU 401 does not calculate the original length unlike the first embodiment. Processing of Steps S412 and S413 is similar to the processing of Steps S112 and S113 of FIG. 8, and hence description thereof is omitted.

In a case where the double feed has been detected one or more times (Step S413: Y), the CPU 401 extracts the edge of the original from the image read by the front-surface reading section 201, to thereby determine whether or not the original width has been detected (Step S414). In a case where the original width has been detected (Step S414: Y), the CPU 401 determines whether or not the original width is equal to or smaller than the predetermined width (Step S415). Processing of Step S415 and Steps S420 and S421 is similar to the processing of Step S214 and Steps S220 and S221 of FIG. 12, and hence description thereof is omitted.

Fifth Embodiment

In a fifth embodiment of the present disclosure, an original size input by the user from the operation panel 604 is used as the condition for determining the double feed. The configurations of the ADF 120 and the image reading apparatus 100 are similar to those in the first embodiment.

Figure 16:
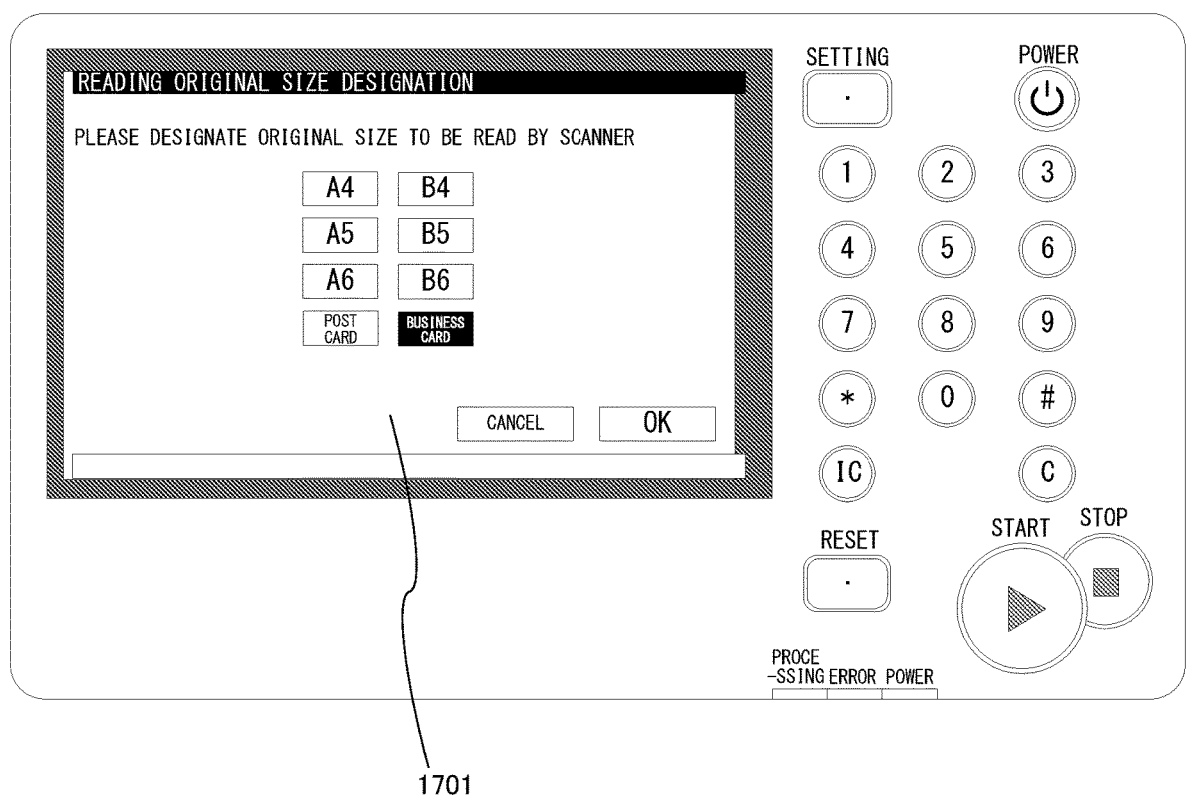
FIG. 16 is an exemplary view of a setting screen.

FIG. 16 is an exemplary view of a setting screen to be displayed on the operation panel 604 when the user inputs the original size. The user uses the operation panel 604 to select the original size from a setting screen 1701 to input the original size. The CPU 601 notifies the CPU 401 of the input original size. The CPU 401 performs determination of the double feed based on the notified original size through processing similar to that in the second embodiment.

In a case where the system controller 600 can communicate to/from an external personal computer or other information terminals, the setting screen 1701 may be displayed on the information terminal. In this case, the user selects the original size from the setting screen 1701 displayed on the information terminal to input the original size.

According to the embodiments described above, the determination of the double feed is performed through use of, in addition to the result of the double-feed detection, the original size (original length, original width) as the condition for determining the double feed. In a case where a length of a section in which the double feed has been detected is smaller than a length used to determine that the double feed has occurred, whether or not the double feed has occurred is determined based on the original size. In a case where the original size is larger than the predetermined length, it is determined that the original has a label or other paper pieces attached thereto. In a case where the original size is equal to or smaller than the predetermined length, it is determined that originals having a small size, for example, a business card size are conveyed in the double-feed state. As a result, accurate determination of the double feed can be made regardless of the size of the original. The conveyance of the original can be stopped when it is determined that the double feed has occurred. Thus, the user can be urged to perform appropriate processing, and, for example, reading omission of an original or occurrence of damages can be prevented.

Embodiments of the present disclosure are described above, but the present disclosure is not limited to the above-mentioned embodiments. Further, the effects described in the embodiments of the present disclosure are the most preferred effects obtained from the present disclosure, and the effects of the present disclosure are not limited to those described in the embodiments of the present disclosure. For example, in the first embodiment, description is given of the determination of the double-feed detection based on the length of the conveyed original, and in the second embodiment and thereafter, description is given of the determination of the double-feed detection based on the original width, but the determination may be made through use of combinations of a plurality of those configurations and methods.

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may include one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random access memory (RAM), a read-only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

What is claimed is:

1. A sheet conveying apparatus comprising:
   a tray on which a plurality of sheets are to be stacked where the tray is configured such that a business card can be stacked on the tray, and the tray further is configured such that a labeled sheet, instead of the business card, to which a label is attached and having a size with a length in a conveyance direction of the labeled sheet larger than a length of the business card in the conveyance direction of the sheet, can be stacked on the tray,
   a feeder configured to successively convey the plurality of sheets stacked on the tray;
   a sheet sensor, arranged in a conveyance path in which a sheet of the plurality of sheets is conveyed, configured to detect the sheet conveyed by the feeder;
   a double-feed sensor configured to detect double feed corresponding to a state in which plural sheets are conveyed in an overlapping manner by the feeder; and
   a controller configured to determine whether or not the double feed has occurred, and to determine, as a determined sheet length and based on a detection result of the sheet sensor, a length of the sheet in the conveyance direction during conveyance of the sheet by the feeder, where a double-feed length corresponds to a length, in the conveyance direction of the sheet, of a region in which the double feed has been detected by the double-feed sensor,
   wherein, in a case where the double-feed length is larger than a predetermined distance which is common to the business card and the labeled sheet, the controller determines that the double feed has occurred,
   wherein, in a case where the double-feed length is smaller than the first predetermined distance but larger than 0 and the determined sheet length is not larger than a predetermined length which is common to the business card and the labeled sheet, the controller determines that the double feed has occurred, and
   wherein, in a case where the double-feed length is smaller than the predetermined distance but larger than 0 and the determined sheet length is larger than the predetermined length, the controller determines that the double feed has not occurred.

2. The sheet conveying apparatus according to claim 1, wherein the double-feed sensor is configured to successively perform detecting operations a plurality of times with respect to a conveyed sheet being conveyed, and
   wherein the controller is configured to count a number of times that the double-feed sensor detects the double feed through performing the detecting operations the plurality of times, and to thereby determine whether the double-feed length is larger than the predetermined distance based on the number of times and on a predetermined number of times determined based on a distance calculated from a cycle of the detecting operations performed by the double-feed sensor and a sheet conveyance speed.

3. The sheet conveying apparatus according to claim 1, further comprising a motor to be used for conveyance of the sheet of the plurality of sheets,
   wherein the controller is configured to determine the length of the sheet based on a number of pulses synchronized with drive of the motor during a period in which the sheet sensor detects the sheet conveyed by the feeder.

4. The sheet conveying apparatus according to claim 1, wherein the controller is configured to determine the length of the sheet based on a time period during which the sheet sensor detects the sheet and on a sheet conveyance speed.

5. The sheet conveying apparatus according to claim 1, wherein the controller is configured to stop conveyance of sheets by the feeder in a case where it is determined by the controller that the double feed has occurred.

6. The sheet conveying apparatus according to claim 1, wherein, in the case where the double-feed length is smaller than the predetermined distance but larger than 0 and the determined sheet length is not larger than the predetermined length, the controller determines that the double feed of the business card has occurred.

7. The sheet conveying apparatus according to claim 1, further comprising an image reader provided downstream of the double-feed sensor in the conveyance direction and configured to read an image of the sheet conveyed by the feeder.

8. The sheet conveying apparatus according to claim 1, wherein the double-feed sensor includes a transmitting sensor configured to transmit an ultrasonic wave and includes a receiving sensor configured to receive the ultrasonic wave transmitted from the transmitting sensor.

* * * * *